United States Patent Office 2,872,448
Patented Feb. 3, 1959

2,872,448
1,5,5-TRISUBSTITUTED BARBITURIC ACIDS

Wilbur J. Doran, Indianapolis, Ind., assignor to Eli Lilly and Company, Indianapolis, Ind., a corporation of Indiana No Drawing. Application April 4, 1956
Serial No. 575,966

6 Claims. (Cl. 260—257)

This invention relates to barbituric acids and more particularly to 1,5,5-trisubstituted barbituric acids and salts thereof, and their preparation.

This application is a continuation-in-part of my copending United States patent application Serial No. 497,392, filed March 28, 1955, now abandoned.

The compounds of the present invention may be represented by the formula

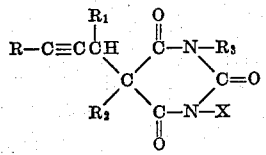

wherein R represents a radical of the group consisting of methyl, ethyl, n-propyl and n-butyl radicals, $R_1$ represents a member of the group consisting of hydrogen, methyl and ethyl radicals, $R_2$ represents a member of the group consisting of ethyl, propyl, isobutyl, allyl, 2-methallyl, and crotyl radicals, $R_3$ represents a member of the group consisting of hydrogen and a methyl radical, $R_1$ is ethyl when R is methyl and X represents hydrogen when the compound is an acid, and represents a metallic or metallic-like radical when the compound is a salt.

The substituted barbituric acids of this invention can be white, crystalline solids or oils. When present in acid form they are insoluble in water but are soluble in the common organic solvents. The salts of the new substituted barbituric acids are solids which are generally soluble in water and the lower alcohols, but are insoluble in most organic solvents.

The barbituric acids of the invention, and their salts, are characterized by their utility as hypnotics and anesthetics. Certain of the compounds, such as for example, 5-ethyl-5-(1-ethyl-2-butynyl) barbituric acid, 5-isopropyl-5-(2-pentynyl) barbituric acid, and 5-ethyl-5-(1-ethyl-2-pentynyl) barbituric acid produce relatively prolonged hypnosis. Others of the compounds, for example 1-methyl-5-allyl-5-(1-methyl-2-pentynyl) barbituric acid, 1-methyl-5-propyl-5-(2-pentynyl) barbituric acid, 5-crotyl-5-(1-methyl-2-pentynyl) barbituric acid and 1-methyl-5-(2-methallyl)-5-(1-methyl-2-pentynyl) barbituric acid are particularly valuable in that they are characterized by an unusually short hypnotic action. Compounds with extremely short action such as is displayed by certain of the compounds of this invention have long been sought, since they would be especially useful as anesthetics in connection with minor surgical measures. The longer acting compounds are useful as sedatives.

Certain of the compounds of the invention contain two asymmetric carbon atoms, and therefore are capable of existing in several isomeric forms. No attempt is made herein specifically to distinguish those forms.

The substituted barbituric acids of the invention can be prepared by various alternative procedures which are well known to the art. Broadly speaking, they can be prepared by several methods. For example, a diester of an appropriately disubstituted malonic acid can be condensed with urea or methyl urea to form the correspondingly substituted barbituric acid. Again, an appropriately disubstituted cyanoacetic ester can be condensed with urea or methyl urea and the iminobarbituric acid which is produced is then hydrolyzed to form the desired substituted barbituric acid. Obviously, instead of employing disubstituted malonic esters or cyanoacetic esters there can be used monosubstituted esters of the named acids, which are converted into 5-monosubstituted barbituric acids or 1,5-disubstituted barbituric acids by reaction with urea or methyl urea, respectively, and the second substituent in the 5-position can be added by condensing the barbituric acid with a halogenated radical containing the desired substituent to be added. The halogenated radicals which are employed for this purpose are readily obtained by means known to the art. Such methods comprise producing intermediate unsaturated alcohols by reaction of acetylene with a suitable Grignard reagent. The acetylenic alcohol which is formed is then halogenated, as for example, by brominating with phosphorus tribromide; and the brominated acetylenic compound is recovered and employed as a reagent for condensation with a monosubstituted barbituric acid prepared as set forth broadly hereinabove. Alternatively, the brominated acetylenic compound can be used for the preparation of the substituted malonic ester or cyanoacetic ester which is used, and the resulting substituted ester is condensed with urea in the usual way. Certain of the acetylenic alcohols, the corresponding brominated acetylene and mono- and di-substituted malonic and cyanoacetic esters are hitherto undescribed, and the preparation of such compounds and their properties are described herein.

Salts of the barbituric acids included within the scope of this invention are readily prepared by the usual methods of the art, as, for example, by interreaction of stoichiometrically equivalent quantities of the selected barbituric acid and a base containing the desired metallic or metallic-like (i. e., substituted ammonium) cation, in a mutual solvent, followed by removal of the solvent to leave the salt as a residue. The preferred salts are the pharmaceutically useful cationic salts, i. e., salts which are not substantially more toxic than the acids from which they are derived, and which can be incorporated in pharmaceutical extending media, liquid or solid, for the preparation of therapeutically useful compositions. Illustrative examples of suitable salts include those of the alkali metals, e. g., sodium and potassium, alkaline earth metals, e. g., calcium, and ammonium and substituted ammonium radicals.

The barbituric acids of the invention are generally employed for therapeutic purposes in the form of their pharmaceutically useful salts. When so employed they can be administered orally or parenterally, and in accordance with the usual practice they are dispersed in a pharmaceutical extending medium for convenient dispensing. Accordingly, the compounds of the invention can be administered in the form of tablets, capsules, elixirs, sterile aqueous solutions for parenteral use and the like.

The following specific examples illustrate the process of each of the methods set forth above, as well as the preparation of certain new intermediates employed in those methods.

EXAMPLE 1

*Preparation of 3-hexyne-2-ol*

A solution of ethyl magnesium bromide was prepared by the reaction of 229 g. of ethyl bromide and 48.6 g. of magnesium in 750 ml. of anhydrous ether. To the ether solution was then added with stirring a solution of 108 g. of ethyl acetylene in 250 ml. of cold anhydrous ether. The addition required approximately three hours, and the mixture was stirred and refluxed for a further period of three and one-half hours. Thereafter there was added to the reaction mixture a solution of 88 g. of freshly distilled acetaldehyde in 170 ml. of anhydrous ether, over a period of about forty-five minutes and at a temperature in the range of about −10° C. to 0° C. The resulting reaction mixture was poured over about 1 kg. of crushed ice, and neutralized with 10 percent aqueous hydrochloric acid. The organic phase of the resulting mixture was separated, and the aqueous phase was extracted three times with 250 ml. portions of ether. The combined organic phase and ether washings were washed twice with water and dried over anhydrous potassium carbonate. The dried ether solution was fractionally distilled, and the 3-hexyne-2-ol formed in the reaction was collected as a fraction boiling at about 79–80° C. at the pressure of 60 mm. of mercury. The index of refraction of the material at 25° C., using the D line of sodium light, was 1.4441–1.4445. The following table shows the physical characteristics of certain hitherto undescribed acetylenic alcohols analogously prepared.

TABLE 1

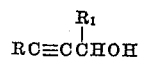

| R | R₁ | B. P., at mm. Hg | $n_D^{25}$ | Analysis | | | |
|---|---|---|---|---|---|---|---|
| | | | | Calculated | | Found | |
| | | | | Percent C | Percent H | Percent C | Percent H |
| CH₃ | CH₃ | 78° at 88 mm | 1.4454 | 71.39 | 9.59 | 70.70 | 10.55 |
| CH₃ | C₂H₅ | 95° at 105 mm | 1.4487 | 73.42 | 10.27 | 73.22 | 10.58 |
| C₂H₅ | CH₃ | 80° at 60 mm | 1.4446 | 73.42 | 10.27 | 73.15 | 10.33 |
| C₃H₇ | CH₃ | 100° at 65 mm | 1.4454 | 74.95 | 10.79 | 75.07 | 11.04 |
| C₂H₅ | C₂H₅ | 95° at 54 mm | 1.4471 | 74.95 | 10.79 | 74.74 | 11.06 |

EXAMPLE 2

*Preparation of 2-bromo-3-hexyne*

A solution of 138 g. of 3-hexyne-2-ol and 9 g. of pyridine in 138 ml. of anhydrous ether was treated with 175 g. of phosphorus tribromide, added dropwise over a period of about twenty minutes at a temperature of about −10° C. The reaction mixture was permitted to come to room temperature while stirring for about three hours, and was then heated to refluxing for about one hour. After cooling, the reaction mixture was poured over about 50 g. of crushed ice. A two-phase system formed, and the ether layer was separated, washed with dilute sodium bicarbonate solution, dried over anhydrous potassium carbonate and fractionally distilled. The 2-bromo-3-hexyne formed in the reaction was collected at 75° C. at the pressure of 50 mm. of mercury. The refractive index of the substance, determined at 25° C. and using the D line of sodium light, was 1.4853–1.4858. The following table shows the physical characteristics of new brominated substituted acetylenes prepared analogously to the process of this example.

TABLE 2

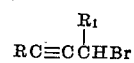

| R | R₁ | B. P., at mm. Hg | $n_D^{25}$ | Analysis | | | |
|---|---|---|---|---|---|---|---|
| | | | | Calculated | | Found | |
| | | | | Percent C | Percent H | Percent C | Percent H |
| CH₃ | CH₃ | 69° at 109 mm | 1.4908 | 40.84 | 4.80 | 40.86 | 5.09 |
| CH₃ | C₂H₅ | 92° at 100 mm | 1.4913 | 44.72 | 5.63 | 42.40 | 5.57 |
| C₂H₅ | CH₃ | 75° at 50 mm | 1.4855 | 44.72 | 5.63 | 44.97 | 5.78 |
| C₃H₇ | CH₃ | 84° at 34 mm | 1.4825 | 48.02 | 6.33 | 47.60 | 6.08 |
| C₂H₅ | C₂H₅ | 74° at 22 mm | 1.4843 | 48.02 | 6.33 | 46.83 | 6.72 |

EXAMPLE 3

*Preparation of diethyl (1-methyl-2-pentynyl) malonate*

To a solution of 28.6 g. of sodium in 430 ml. of absolute ethanol were added 200 g. of diethyl malonate. About half of the alcohol was removed by distillation in vacuo, and thereafter a solution of 200 g. of 2-bromo- 3-hexyne in 100 ml. of anhydrous ether was added slowly to the reaction mixture. The heat of reaction brought about refluxing during the addition of the 2-bromo-3-hexyne, and when the addition was complete the reaction mixture was heated to refluxing for a further period of thirty minutes. A sufficient amount of water was then added to the reaction mixture to dissolve the sodium bromide which had formed, and the only organic layer was separated, washed with water and dried over anhydrous magnesium sulfate. The dried organic layer was then fractionally distilled under reduced pressure, and the diethyl (1-methyl-2-pentynyl) malonate formed in the reaction was collected at about 117° C.–120° C. at the pressure of 2 mm. of mercury. The index of refraction, determined at 25° C. using the D line of sodium light, was 1.4425.

EXAMPLE 4

*Preparation of diethyl allyl (1-methyl-2-pentynyl) malonate*

A solution of 12.1 g. of sodium in 182 ml. of absolute ethanol was prepared, and thereto were added 126.6 g. of diethyl (1-methyl-2-pentynyl) malonate. Most of the ethanol was then distilled off under reduced pressure, and the residue was cooled and 63.5 g. of allyl bromide were slowly added thereto. After completion of the addition, the mixture was refluxed for about one hour. The reaction mixture was cooled, treated with about 100 ml. of water, and the oily organic layer which formed was removed, washed with water and dried over anhydrous magnesium sulfate. The dried oily organic material was fractionally distilled in vacuo, and diethyl allyl (1-methyl-2-pentynyl) malonate boiling at 105–107° C. at the pressure of 1 mm. of mercury was recovered. The index of refraction of this substance, determined at 25° C. and using the D line of sodium light, was 1.4547–1.4557. The following table shows the physical characteristics of certain new substituted malonic esters prepared by the processes of Examples 3 and 4.

TABLE 3

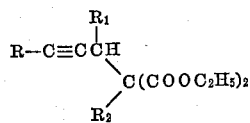

| R | $R_1$ | $R_2$ | B. P. at mm. Hg | $n_D^{25}$ | Analysis Calculated Percent C | Calculated Percent H | Found Percent C | Found Percent H |
|---|---|---|---|---|---|---|---|---|
| $CH_3$ | $CH_3$ | $C_2H_5$ | 120° at 5 mm | 1.4493 | 66.11 | 8.72 | 65.63 | 8.88 |
| $CH_3$ | $C_2H_5$ | $C_2H_5$ | 128° at 4 mm | 1.4507 | 67.13 | 9.02 | 67.42 | 9.20 |
| $C_2H_5$ | $CH_3$ | $C_2H_5$ | 119° at 2 mm | 1.4482 | 67.13 | 9.02 | 67.03 | 8.85 |
| $C_2H_5$ | H | $n-C_3H_7$ | 118° at 2 mm | 1.4434 | 67.13 | 9.02 | 66.60 | 8.53 |
| $C_2H_5$ | H | $i-C_3H_7$ | 100° at 0.1 mm | 1.4484 | 67.13 | 9.02 | 67.24 | 9.27 |
| $C_2H_5$ | H | allyl | 100° at <1 mm | 1.4516 | 67.64 | 8.33 | 67.41 | 8.36 |
| $C_2H_5$ | H | $i-C_4H_9$ | 113° at 1 mm | 1.4444 | 68.05 | 9.28 | 67.53 | 9.11 |
| $C_2H_5$ | H | 2-methallyl | 110° at <1 mm | 1.4542 | 68.54 | 8.63 | 68.10 | 8.89 |
| $C_2H_5$ | $CH_3$ | H | 123° at 7 mm | 1.4420 | 64.98 | 8.39 | 64.79 | 8.47 |
| $C_2H_5$ | $CH_3$ | $n-C_3H_7$ | 139° at 5 mm | 1.4478 | 68.05 | 9.28 | 67.88 | 9.13 |
| $C_2H_5$ | $CH_3$ | $i-C_3H_7$ | 121° at 1 mm | 1.4508 | 68.05 | 9.28 | 67.67 | 9.46 |
| $C_2H_5$ | $CH_3$ | allyl | 112° at 1 mm | 1.4549 | 68.54 | 8.63 | 68.39 | 8.39 |
| $C_2H_5$ | $CH_3$ | crotyl | 147° at 3 mm | 1.4577 | 69.35 | 8.90 | 69.53 | 8.84 |
| $C_2H_5$ | $CH_3$ | 2-methallyl | 111° at 1 mm | 1.4581 | 69.35 | 8.90 | 69.10 | 9.00 |
| $n-C_3H_7$ | $CH_3$ | $C_2H_5$ | 106° at <1 mm | 1.4482 | 68.05 | 9.28 | 67.16 | 9.08 |
| $C_2H_5$ | $C_2H_5$ | H | 105° at 1 mm | 1.4432 | 66.11 | 8.72 | 66.75 | 9.43 |
| $C_2H_5$ | $C_2H_5$ | $C_2H_5$ | 103° at <1 mm | 1.4482 | 68.05 | 9.28 | 68.36 | 9.54 |
| $C_2H_5$ | $C_2H_5$ | allyl | 125° at <1 mm | 1.4546 | 69.35 | 8.90 | 68.80 | 9.12 |

EXAMPLE 5

*Preparation of 1-methyl-5-allyl-5-(1-methyl-2-pentynyl) barbituric acid by method A*

A solution of 23.8 g. of sodium in 360 ml. of absolute alcohol was prepared and thereto were added 38.3 g. of methyl urea and 96.8 g. of diethyl allyl (1-methyl-2-pentynyl) malonate. The mixture was refluxed for about twenty hours, cooled, and the ethanol was removed by distillation in vacuo. The residue was dissolved in about 300 ml. of water and the aqueous solution was washed with ether, and the washings were discarded. The aqueous solution was then acidified with acetic acid, and extracted with three 150 ml. portions of ether. The combined ether extracts were washed with 5 percent aqueous sodium bicarbonate solution, dried over anhydrous sodium sulfate, and fractionally distilled in vacuo. The fraction boiling at about 145–150° C. at the pressure of 0.5 mm. of mercury, weighing 61 g. and consisting of 1-methyl-5-allyl-5-(1-methyl-2-pentynyl) barbituric acid, was collected. The oily distillate was substantially pure, and could be used as such in pharmaceutical preparations or a salt could be prepared therefrom according to the procedures disclosed hereinafter. On standing, the oil crystallized. The crystalline 1-methyl-5-allyl-5-(1-methyl-2-pentynyl) barbituric acid melted at about 60–64° C. after recrystallization from dilute ethanol.

EXAMPLE 6

*Preparation of 5-(2-pentynyl)-5-n-propyl barbituric acid by method B*

To a solution of 17 g. of 5-n-propyl barbituric acid in 100 ml. of 50 percent ethanol were added 8 g. of 50 percent sodium hydroxide solution. To this solution were added 16.1 g. of 1-bromo-2-pentyne and the reaction mixture was refluxed for about four hours. The ethanol was then removed by distillation and the residue was extracted with two 75 ml. portions of ether. The combined ether extracts were washed with two 30 ml. portions of 10 percent aqueous sodium bicarbonate solution. The ether phase was separated and extracted with 80 ml. of 5 percent aqueous sodium hydroxide solution. The alkaline extract was acidified with dilute hydrochloric acid, whereupon a precipitate of 5-(2-pentynyl)-5-n-propyl barbituric acid formed. The precipitate was removed, washed with water and recrystallized from warm dilute alcohol.

5-(2-pentynyl)-5-n-propyl barbituric acid thus prepared melted at about 168° C.

EXAMPLE 7

*Preparation of sodium 1-methyl-5-allyl-5-(1-methyl-2-pentynyl) barbiturate*

A solution of 61 g. of 1-methyl-5-allyl-5-(1-methyl-2-pentynyl) barbituric acid in 100 ml. of ether was extracted with 465 ml. of 2 percent aqueous sodium hydroxide solution. The aqueous extract was washed with successive 75 ml. and 50 ml. portions of ether. The pH of the aqueous solution was adjusted to 11.7, using 5 percent aqueous sodium hydroxide solution. Five grams of decolorizing carbon were added to the solution with stirring; the mixture was permitted to stand for twenty minutes at room temperature, and the carbon was removed by filtration. A solution containing 4 g. of sodium carbonate in 25 ml. of water was added to the aqueous solution, and the mixture was filtered sterile through a porcelain filter candle of 02 porosity into sterile bottles. The aqueous solution was then dried from the frozen state, whereupon a sterile residue of sodium 1-methyl-5-allyl-5-(1-methyl-2-pentynyl) barbiturate, weighing about 62 g. was obtained.

EXAMPLE 8

*Preparation of 5-allyl-5-(1-methyl-2-pentynyl) barbituric acid*

To a solution prepared by dissolving 14.8 g. of sodium in 225 ml. of absolute ethanol were added 19.5 g. of urea and 60.4 g. of diethyl allyl (1-methyl-2-pentynyl) malonate The reaction mixture was refluxed for about eighteen hours, cooled, and the ethanol was removed by distillation in vacuo. The residue was dissolved in 200 ml. of water and extracted with three 50 ml. portions of ether. The aqueous solution was acidified with concentrated hydrochloric acid, whereupon an oil, consisting of 5-allyl-5-(1-methyl-2-pentynyl) barbituric acid, precipitated. The precipitated oil crystallized on standing, and was removed by filtration, washed with water and recrystallized from dilute alcohol. 5-allyl-5-(1-methyl-2-pentynyl) barbituric acid thus prepared melted at about 140–143° C. The yield was 40 g., or about 75 percent of theoretical.

EXAMPLE 9

*Alternative preparation of 1-methyl-5-allyl-5-(1-methyl-2-pentynyl) barbituric acid*

To a solution of 24.8 g. of 5-allyl-5-(1-methyl-2- pentynyl) barbituric acid in 130 ml. of water containing 8 g. of 50 percent sodium hydroxide were added 13 g. of dimethyl sulfate, over a period of about ten minutes. The mixture was stirred for about three hours at room temperature. An oily layer formed during the reaction, and was separated by extraction with three 50 ml. portions of ether. The ethereal extracts were combined, washed with water and dilute aqueous sodium bicarbonate solution, and then were extracted with 150 ml. of water containing 8 g. of 50 percent sodium hydroxide. The alkaline solution was acidified using acetic acid whereupon 1-methyl-5-allyl-5-(1-methyl-2-pentynyl) barbituric acid separated as an oil and was removed. The oil crystallized on standing, or on seeding with a crystal of 1-methyl-5-allyl-5-(1-methyl-2-pentynyl) barbituric acid previously obtained.

EXAMPLE 10

*Preparation of ethyl (1-methyl-2-pentynyl)cyanoacetate*

To a solution of 23 g. of sodium in 345 ml. of absolute ethanol were added 113 g. of ethyl cyanoacetate. The mixture was cooled and maintained at about 40–50° C. while 161 g. of 2-bromo-3-hexyne were added thereto. The reaction mixture was stirred for about one hour without heating and then was gradually warmed to about 60° C. Most of the ethanol was removed from the reaction mixture by distillation in vacuo, and the residue was washed with water, dried over anhydrous magnesium sulfate and fractionally distilled in vacuo. The fraction boiling at 121° C. at the pressure of 5 mm. of mercury, and consisting of ethyl (1-methyl-2-pentynyl) cyanoacetate, was collected. The index of refraction of the material, determined at 25° C. and using the D line of sodium light, was 1.4475–1.4488.

EXAMPLE 11

*Preparation of ethyl allyl (1-methyl-2-pentynyl) cyanoacetate*

A solution of 5.65 g. of sodium in 85 ml. of absolute ethanol was prepared, and 47.5 g. of ethyl (1-methyl-2-pentynyl) cyanoacetate were added thereto while stirring and cooling the mixture. After all of the ester had been added, 30 g. of allyl bromide were added to the mixture while continuing stirring and cooling, and the mixture was allowed to stand at room temperature for about one-half hour. The alcohol was removed from the reaction mixture by evaporation in vacuo, and the residue was washed with water, rendered anhydrous and fractionally distilled in vacuo. Ethyl allyl (1-methyl-2-pentynyl cyanoacetate boiling at about 105–107° C. at the pressure of 1 mm. of mercury was obtained. The refractive index of the product, determined at 25° C. and using the D line of sodium light, was 1.4583–1.4593.

Following the same procedure, except that n-propyl bromide is used in place of allyl bromide, there is obtained ethyl n-propyl-(1-methyl-2-pentynyl) cyanoacetate having B. P. 137–139° C. at the pressure of 7 mm. of mercury; and index of refraction $n_D^{25}$=1.4503–1.4523.

EXAMPLE 12

*Preparation of 1-methyl-5-allyl-5-(1-methyl-2-pentynyl) barbituric acid by method C*

To a solution of 12.7 g. of sodium in 195 ml. of absolute ethanol were added 20.5 g. of methyl urea and 43 g. of ethyl allyl (1-methyl-2-pentynyl) cyanoacetate. The mixture was heated to refluxing for about seventeen hours. The alcohol was then removed by distillation in vacuo, and the residue was dissolved in about 100 ml. of water. The aqueous solution was made acid with acetic acid, whereupon an oil, consisting of 5-allyl-5-(1-methyl-2-pentynyl)-4-imino-1-methyl barbituric acid separated. The oily precipitate crystallized upon standing and was removed from the aqueous phase by filtration. The crystalline material was washed with water and recrystallized several times from dilute methanol whereupon it melted at about 92–94° C.

When the process was repeated using ethyl n-propyl-(1-methyl-2-pentynyl) cyanoacetate, there was obtained 5-n-propyl-5-(1-methyl-2-pentynyl)-4-imino-1-methyl barbituric acid which melted at about 102° C.

A solution of 20 g. of 5-allyl-5-(1-methyl-2-pentynyl)-4-imino-1-methyl barbituric acid in 200 ml. of water containing 10 ml. of concentrated hydrochloric acid was heated to refluxing for about one hour, during which time an oil separated from the solution. The reaction mixture was cooled, whereupon the oily precipitate crystallized and was removed by filtration, washed with water and recrystallized several times from dilute ethanol. A yield of 17.6 g. was obtained. The 1-methyl-5-allyl-5-(1-methyl-2-pentynyl) barbituric acid thus prepared melted at about 94.96° C.

When hydrolyzed in the same manner as above, 5-n-propyl-5-(1-methyl-2-pentynyl)-4-imino-1-methyl barbituric acid yielded 5-n-propyl-5-(1-methyl-2-pentynyl)-1-methyl barbituric acid which was an oil at ordinary temperatures.

Using the processes described hereinabove as methods A and B, and intermediates prepared as described therein or known to the art, the following compounds which are illustrative of the barbituric acids within the scope of the invention are prepared. Table 4 sets forth the substituents of those compounds, the methods used in their preparation, and the results of elementary analysis of the compounds thus prepared.

TABLE 4

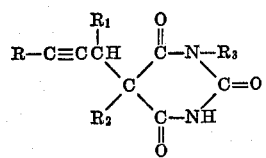

| Method Used | R | R₁ | R₂ | R₃ | M. P., °C. | Calculated, Percent N | Found, Percent N |
|---|---|---|---|---|---|---|---|
| A | CH₃ | CH₃ | C₂H₅ | H | 152 | 12.61 | 12.96 |
| A | CH₃ | CH₃ | n-C₃H₇ | H | 171 | 11.86 | 11.65 |
| A | CH₃ | C₂H₅ | C₂H₅ | H | 144 | 11.86 | 12.00 |
| B | C₂H₅ | H | n-C₃H₇ | H | 168 | 11.86 | 11.74 |
| B | C₂H₅ | H | n-C₃H₇ | CH₃ | 67 | 11.19 | 11.28 |
| B | C₂H₅ | H | i-C₃H₇ | H | 162 | 11.86 | 12.04 |
| A | C₂H₅ | H | i-C₃H₇ | CH₃ | oil; B. P. 140°; 0.1 mm. | 11.19 | 11.30 |
| A | C₂H₅ | H | allyl | H | 139 | 11.96 | 11.78 |
| A | C₂H₅ | H | allyl | CH₃ | 63 | 11.29 | 11.09 |
| B | C₂H₅ | H | i-C₄H₉ | H | 172 | 11.19 | 11.04 |
| A | C₂H₅ | H | i-C₄H₉ | CH₃ | 83 | 10.60 | 10.40 |
| B | C₂H₅ | H | 2-methallyl | H | 165 | 11.29 | 11.22 |
| A | C₂H₅ | H | 2-methallyl | CH₃ | 96 | 10.68 | 10.78 |
| B | C₂H₅ | CH₃ | C₂H₅ | H | 157 | 11.86 | 11.81 |
| B | C₂H₅ | CH₃ | C₂H₅ | CH₃ | oil; B. P. 170°; 1 mm. | 11.19 | 11.31 |
| A | C₂H₅ | CH₃ | n-C₃H₇ | H | 160 | 11.19 | 11.35 |
| A | C₂H₅ | CH₃ | i-C₃H₇ | H | 192 | 11.19 | 11.42 |
| A | C₂H₅ | CH₃ | crotyl | H | 160 | 10.68 | 10.66 |
| A | C₂H₅ | CH₃ | crotyl | CH₃ | 96 | 10.14 | 10.27 |
| A | C₂H₅ | CH₃ | 2-methallyl | H | 153 | 10.68 | 10.53 |
| A | C₂H₅ | CH₃ | 2-methallyl | CH₃ | 112 | 10.14 | 9.92 |
| A | C₂H₅ | C₂H₅ | C₂H₅ | H | 170 | 11.19 | 11.27 |
| A | C₂H₅ | C₂H₅ | C₂H₅ | CH₃ | 111 | 10.60 | 10.42 |
| A | C₂H₅ | C₂H₅ | allyl | H | 126 | 10.68 | 10.64 |
| A | C₂H₅ | C₂H₅ | allyl | CH₃ | 103 | 10.14 | 10.32 |
| A | n-C₃H₇ | CH₃ | C₂H₅ | H | 132 | 11.19 | 11.19 |
| A | n-C₃H₇ | CH₃ | C₂H₅ | CH₃ | 70 | 10.60 | 10.48 |
| B | n-C₃H₇ | CH₃ | allyl | H | 124 | 10.68 | 10.64 |
| B | n-C₃H₇ | CH₃ | i-C₄H₉ | H | 142 | 10.07 | 10.35 |
| B | n-C₄H₉ | H | C₂H₅ | H | 105 | 11.19 | 11.12 |

I claim:

1. A compound selected from the group consisting of a barbituric acid and the pharmaceutically useful salts thereof, said barbituric acid represented by the formula

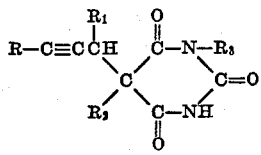

wherein R represents a radical of the group consisting of methyl, ethyl, n-propyl and n-butyl radicals, R₁ represents a member of the group consisting of hydrogen, methyl and ethyl radicals, R₂ represents a member of the group consisting of ethyl, propyl, isobutyl, allyl, 2-methallyl and crotyl radicals, R₃ represents a member of the group consisting of hydrogen and a methyl radical, and R₁ is ethyl when R is methyl.

2. 1-methyl-5-allyl-5-(1-methyl-2-pentynyl) barbituric acid.
3. 5-allyl-5-(1-methyl-2-pentynyl) barbituric acid.
4. 5-ethyl-5-(1-methyl-2-pentynyl) barbituric acid.
5. 5-(2-methallyl)-5-(1-methyl-2-pentynyl) barbituric acid.
6. 1-methyl-5-allyl-5-(2-pentynyl) barbituric acid.

References Cited in the file of this patent
UNITED STATES PATENTS

| | | |
|---|---|---|
| 1,682,062 | Bockmuhl | Aug. 28, 1928 |
| 2,776,289 | Fiordalisi | Jan. 1, 1957 |

FOREIGN PATENTS

| | | |
|---|---|---|
| 19,588 | Netherlands | Feb. 15, 1929 |
| 124,869 | Switzerland | Mar. 1, 1928 |
| 127,177 | Switzerland | Aug. 16, 1928 |

OTHER REFERENCES

Shonle et al.: J. Am. Chem. Soc., 55, 4649–52 (1933).